(12) United States Patent
Razzacki

(10) Patent No.: US 6,889,131 B2
(45) Date of Patent: May 3, 2005

(54) TRANSMISSION GEAR RATIO SELECTION

(75) Inventor: Syed T Razzacki, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/925,761

(22) Filed: Aug. 25, 2004

(65) Prior Publication Data

US 2005/0021209 A1 Jan. 27, 2005

Related U.S. Application Data

(62) Division of application No. 10/234,342, filed on Sep. 4, 2002, now Pat. No. 6,827,666.

(51) Int. Cl.$^7$ .......................... G06F 17/00; B60K 41/04
(52) U.S. Cl. .............................. 701/55; 701/51; 477/34; 477/115; 475/904
(58) Field of Search .............................. 701/51, 55, 56, 701/64, 70, 87; 477/34, 37, 115; 74/113, 337, 84 R; 475/904

(56) References Cited

U.S. PATENT DOCUMENTS

| | | | | |
|---|---|---|---|---|
| 5,546,822 A | * | 8/1996 | Fowler | 74/113 |
| 6,053,834 A | | 4/2000 | Savoyard et al. | 475/145 |
| 6,135,917 A | * | 10/2000 | Takizawa et al. | 477/98 |
| 6,427,108 B1 | * | 7/2002 | Kanasugi et al. | 701/51 |
| 6,438,510 B2 | * | 8/2002 | Zhu et al. | 702/175 |
| 6,679,808 B2 | * | 1/2004 | Tanaka et al. | 477/115 |

OTHER PUBLICATIONS

Manual Transmission Design and Application for Improved Fuel Economy and Efficiency, Syed T. Razzacki.
An Overview of Current Automatic, Manual and Continuously Variable Transmission Efficiencies and Their Projected Future Improvements, M.A. Kluger, D.M. Long; SAE Technical Paper Series, No. 1999–01–1259 (Mar. 1999), pp. 1–6.
Design, Evaluation, and Selection of Heavy Duty Rear Axles, K.W. Gordon (1954), pp. 1–31.
Determination of Gear Ratios, W.C. Orthwein; Gear Technology, the Journal of Gear Manufacturing (Aug./Sep. 1984), pp. 35–36, 44.
Component Inertial Effects on Transmission Design, R.L. Seaman, C.E., Johnson, R.F., Hamilton; SAE Technical Paper Series, No. 841686 (1984), pp. 1–20.
What is EHD?, L.D. Wedeven; Lubrication Engineering, Journal of the American Society of Lubrication Engineers, vol. 31 (Jun. 1975) pp. 291–296.

* cited by examiner

Primary Examiner—Thomas G. Black
Assistant Examiner—Arthur D. Donnelly
(74) Attorney, Agent, or Firm—Ralph E. Smith

(57) ABSTRACT

An objective method is provided for selecting gear ratios for use in a motor vehicle transmission having multiple selectable gears. The method includes selecting gear ratios for a specific application includes calculating a low gear ratio, and a high gear ratio based upon vehicle parameters and performance requirements. The total ratio spread is determined by dividing the low gear ratio by the high gear ratio. Using the total ratio spread, a geometric sequence is created with a plurality of terms, such that each of the terms respectively represent the ratio steps between the gears. Lastly, each gear ratio is divided by its respective ratio step plus one to find the gear ratio for the next gear. This method provides an objective method for selecting gear ratios, such that the steps between each of the ratios are uniformly progressive.

17 Claims, 2 Drawing Sheets

TRANSMISSION GEAR RATIO SELECTION

CROSS REFERENCE TO RELATED APPLICATIONS

This application is a divisional of U.S. patent application Ser. No. 10/234,342, filed Sep. 4, 2002 now U.S. Pat. No. 6,827,666.

FIELD OF THE INVENTION

The present invention relates to a method of selecting gear ratios for an automobile transmission during a design phase thereof, more particularly, to a method of selecting gear ratios having uniformly progressive ratio steps for an automobile transmission having a plurality of gears.

BACKGROUND OF THE INVENTION

For any given vehicle, transmission gear ratios are selected to satisfy performance requirements of gradability, fuel economy, acceleration, and ease of operation. Fuel economy considerations are essential to the selection of gear ratios. Numerically too high a gear ratio causes the engine to run too fast and thus, failing to operate at optimum fuel efficiency. Alternatively, an extremely low numerical gear ratio adversely effects vehicle performance, such as acceleration. Hence, acceleration is also an important concern in gear ratio selection. To maximize acceleration, gear ratios should be selected such that upshifts occur only when the next higher gear will provide more torque to the drive wheels.

Providing maximum torque to the drive wheels in each gear requires consideration of the ratio steps. Wide ratio steps in the lower gears provide for favorable fuel efficiency due to less frequent shifting. However, shifting through wide ratio steps requires skillful execution, otherwise a loss in fuel efficiency occurs. Alternatively, narrow ratio steps keep the engine running at or near full speed, thus supplying near maximum torque to the drive wheels. By skipping gears in narrow ratio step configurations, what is commonly referred to as skip shifting, a driver can simulate driving a wider step configuration, thus increasing fuel efficiency. Hence, selection of transmission gear ratios requires a balancing of various performance factors with the skill required of the end user.

Implementing ratio steps that decrease from low gear to high gear typically help to balance these performance factors. This decreasing trend between ratio steps illustrates what is called progressively smaller ratio steps. Progressively smaller ratio steps lend to maximum vehicle performance and maximum fuel efficiency, while providing a linear feel to the shifting process.

Historically, transmission designers have subjectively implemented progressive ratio steps. This subjective approach however, fails to produce truly uniform progressive ratio steps, meaning ratio steps which uniformly decrease from low gear to high gear. Thus, there stands a desire to eliminate the guesswork and subjectivity involved with selecting ratio steps. More specifically, there stands a desire to objectively select uniformly progressive ratio steps in order to maximize vehicle output efficiency.

SUMMARY OF THE INVENTION

The above objectives are satisfied with a logical method of selecting gear ratios. Typical transmissions contain multiple forward drive gears, thus, for each drive gear, there exists a fixed input to output gear ratio. Hence, a first step in selecting gear ratios includes calculating a low gear ratio, and a high gear ratio based upon the specific vehicle parameters and performance requirements. Next, the total ratio spread is determined by dividing the low gear ratio by the high gear ratio. Using the total ratio spread, a geometric sequence is created having a plurality of terms, such that each of the terms respectively represent the ratio steps between the two consecutive gears. Once the geometric sequence is created, its terms enable one to determine the gear ratio for each gear by dividing the immediately previous gear ratio by its respective ratio step plus one. This method ensures the selection of gear ratios having truly uniform progressive ratio steps.

Further areas of applicability of the present invention will become apparent from the detailed description provided hereinafter. It should be appreciated that the Applicant intends for the detailed description and specific examples discussed herein to only illustrate the preferred embodiment of the present invention and not to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment merely exemplifies the nature of the invention and is in no way intended to limit its scope, its application, or its uses.

Figure 1:
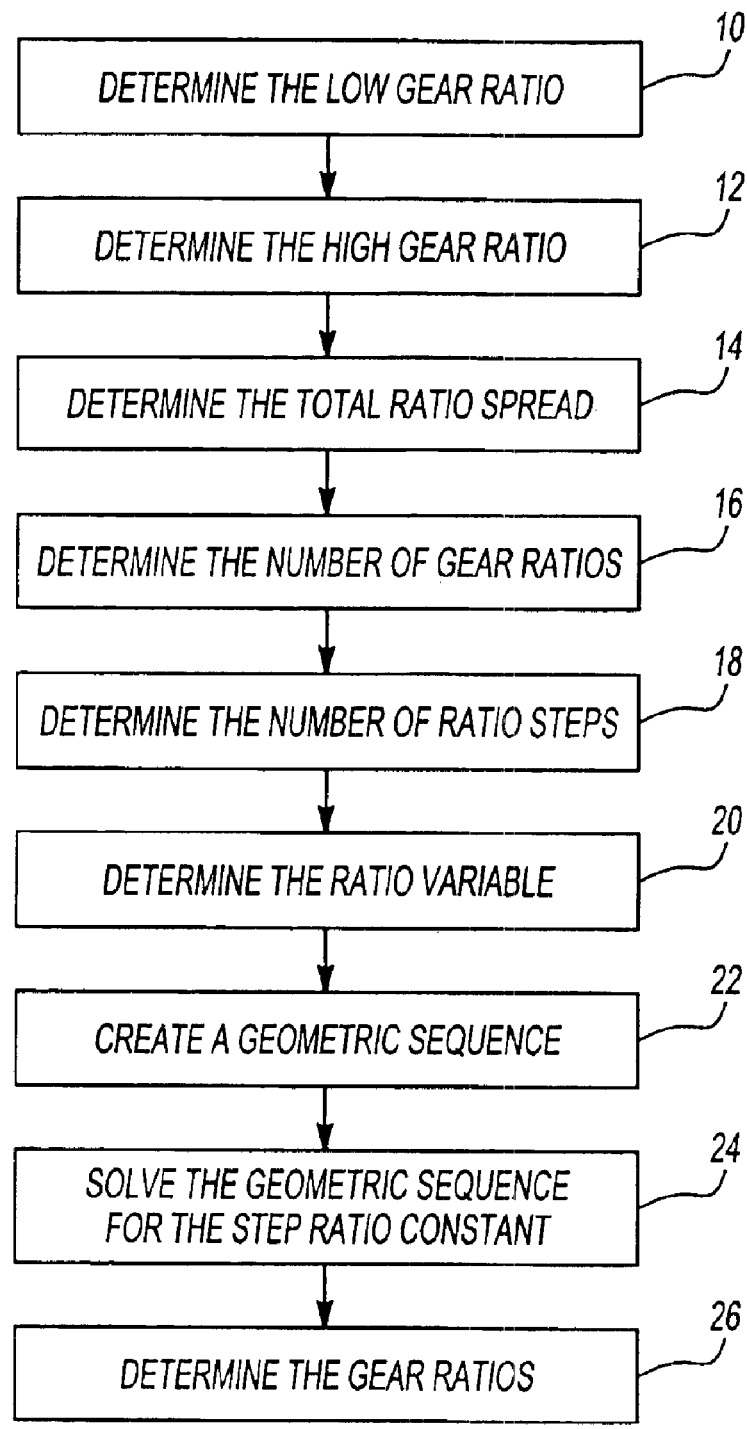
FIG. 1 is a block diagram representing the steps for the method of selecting gear ratios in accordance with the preferred embodiment of the present invention.

The preferred embodiment of the present invention includes a method for selecting lay to output gear ratios for a transmission capable of producing multiple input to output gear ratios. The diagram shown in FIG. 1 represents the steps of the preferred embodiment. First, a low gear ratio is calculated at block 10, and a high gear ratio is calculated at block 12, each based on the specific parameters and performance requirements of the application. It should be appreciated that a number of well-known methods may be used for determining low and high gear ratios for specific vehicles and that this invention is not limited by any one method.

An exemplary method for determining the low gear ratio is based upon engine piston displacement. It can be shown that piston displacement is related to acceleration, fuel economy, and launchability as follows: $N/V=(R_t*R_a*TR)/60$, where N is engine revolutions per minute, V is the vehicle velocity, $R_t$ is the transmission gear ratio, $R_a$ is the output or axle gear ratio, and TR is the tire revolutions per mile. For one revolution of the engine, $E/2$ $in^3$ fuel is displaced, where E is the total engine displacement; and W (the gross vehicle weight) is moved $1/(R_t*R_a*TR)$ miles. Hence, the piston displacement can be calculated as:

$$D = (60*E*N)/(2*W*V)$$

$$= \frac{E}{2}\left(\frac{\text{ft}}{12}\right)^3 \times \frac{1}{W \text{ lbs}} \times \left(\frac{2000 \text{ lbs}}{\text{ton}}\right) \times \frac{N}{V} \times 60$$

$$= 34.7*(E*N)/(V*W) \text{ ft}^3/\text{ton-mile,}$$

or in metric units,

D=(30*I*N)/(V*W), where I is the engine displacement in liters. Finally, from the piston displacement, the overall low gear ratio is defined as, $$R_{oal}=R_l*R_a=(1.73*D*W)/(E*TR).$$

Once the overall low gear ratio $R_{oal}$ is determined, the low gear ratio ($R_l$) can be determined by dividing the overall low gear ratio by the axle or final drive gear ratio ($R_a$), which is pre-selected and thus, known.

An exemplary embodiment includes determining the high gear ratio based upon the desired terminal velocity of the vehicle using the same relationship deduced above, N/V= ($R_t*R_a*TR$)/60. Knowing the desired terminal velocity, V, the axle or output gear ratio, $R_a$, the number of tire revolutions per mile, TR, and the engine revolutions per minute, N, $R_t$ is solved for, which in this instance is equal to $R_h$, the high gear ratio. This high gear ratio can be verified from determining the power required and power available versus the road speed. If the power required and the power available in each gear are plotted against the corresponding speed, then the top speed in that gear will occur at the point where the power available curve crosses the power required curve. The tractive force at the wheels supplied by the power available from the vehicle power plant is opposed by various external forces called resistances. The sum of the respective powers required to overcome these resistances should be less than the power available to move the vehicle.

Referring again to FIG. 1, after determining the low and high gear ratios, a total ratio spread (S) is determined at block 14, by dividing the low gear ratio by the high gear ratio ($R_l/R_h$). Next, the number of gear ratios (n) is determined at block 16, typically this is predetermined to be 4, 5, or 6 for a specific automobile application. Thus, the number of ratio steps (rs) is then determined at block 18, which includes subtracting one from the number of gear ratios (rs=n−1). Hence, a five-speed forward drive transmission would have four ratio steps.

The number of ratio steps and the total ratio spread is then utilized to define a new variable called the ratio variable (K) at block 20, by raising the total ratio spread to one over the number of ratio steps ($K=S^{1/n}$). In the preferred embodiment, the next step of creating a geometric sequence at block 22 is done such that the percent step of the ratio of any two consecutive terms of the geometric sequence equals a constant, called the step ratio constant, thus establishing uniformly progressive ratio steps. More specifically, at block 24 the sequence is solved wherein the general expression $(K-1)^x$ denotes the ratio step between any two gear ratios for different values of x. Letting (K−1)=a, each ratio step can be expressed as $n_1=(K-1)^{x_1}=a^{x_1}$, $n_2=(K-1)^{x_2}=a^{x_2}$, $n_3=(K-1)^{x_3}=a^{x_3}$ . . . $n_n=(K-1)^{x_n}=a^{x_n}$, whereby each of the values of n represent the terms of a geometric sequence. Therefore, there exists a constant relationship, represented as $a^{x_2}/a^{x_1}=a^{x_3}/a^{x_2}=a^{x_n}/a^{x_n}{}_{-1}=r$, wherein r is the step ratio constant. The resulting step ratio constant is what defines the ratio steps as uniformly progressive. This step ratio constant, r, is substituted into the above equations such that, $n_1=a^{x_1}$, $n_2=ra^{x_1}$, $n_3=r^2a^{x_1}$ . . . $n_n=r^{n-1}a^{x_1}$ for all subscripts of n from 1 to n−1.

Therefore, gear ratios for each gear between the low gear and the high gear are calculated using the following equations, where $R_1$, $R_2$, $R_3$, and so on are the first, second, third, and so on, gear ratios;

$$R_2=R_1/(1+n_1)=R_1/(1+a^{x_1});$$

$$R_3=R_2/(1+n_2)=R_1/((1+n_1)(1+n_2))=R_1/((1+a^{x_1})(1+ra^{x_1})) \ldots \text{ and so on; such that,}$$

$$R_n=R_{n-1}/(1+n_{n-1})=R_{n-1}/(1+r^{n-2}a^{x_1})=R_1/((1+a^{x_1})(1+ra^{x_1})(1+r^2a^{x_1})(1+r^3a^{x_1}) \ldots (1+r^{n-2}a^{x_1})),$$

for all subscripts of n from 2 to n. In the final equation stated above, $R_1$ and $R_n$ were previously determined to be the low and high gear ratios. Hence, r and $a^{x_1}$ remain unsolved. Simplifying the equation by assuming that $r=a^{x_1}$ reveals the following equation: $R_1/R_n=(1+r)(1+r^2)(1+r^3) \ldots (1+r^{n-1})$. This equation is solved for r using any mathematical computer program such as MICROSOFT XL SOLVER or MATLAB, and then its value is plugged back into the above equations to solve for $R_1$, $R_2$, $R_3$ and so on.

The magnitude of r, the step ratio constant, varies with the size and application of the vehicle. An application having a first ratio step of approximately seventy percent (0.70) or higher between the first and second gears, meaning the second gear ratio equals 170% that of the first gear ratio, will reveal a step ratio constant of approximately thirty percent (0.30) or higher. Alternatively, a different application having a first step ratio of less than seventy percent (0.70) will reveal a step ratio constant between twenty and thirty percent (0.20–0.30). Hence, closer ratio steps will reveal a smaller step ratio constant, enabling one to tailor the ratio steps in accordance with the vehicle application, such as gradability, acceleration, or terminal velocity. Furthermore, narrower steps enable the engine to operate at or near maximum speed most of the time, and the user can increase fuel efficiency further by skip shifting. It has been observed that a ratio of the skip shifted gears, i.e., every other gear, less than or equal to 2.5 promotes smoother shifting. Hence, assessing the skip shift index lends to the tailoring of the specific application and end user. A highly skilled driver may prefer a wider skip shift index for increased torque, while an average driver may prefer a narrower skip shift index for smoother shifting.

In another embodiment, particularly an off-road embodiment, the terms of the sequence are determined such that the ratios of the terms to their immediately previous terms, or in other words, the ratios of the ratio steps to their immediately previous ratio steps, create a geometric sequence themselves. This provides taller steps for creeping in low gears and shorter steps for faster speeds in high gears. This type of sequence is accomplished in a manner similar to that above, just that it produces a different result. In an exemplary embodiment, this relationship can be expressed as $r=a^{x_2}/a^{x_1}$, $r^2=a^{x_3}/a^{x_2}$, $r^4=a^{x_4}/a^{x_3}$, $r^8=a^{x_5}/a^{x_4}$, and so on. Thus, the ratio steps between gears become $n_1=a^{x_1}$, $n_2=ra^{x_1}$, $n3=r^3a^{x_1}$, $n_4=r^7a^{x_1}$, $n_5=r^{15}a^{x_1}$, and so on. Again, beginning with an equation such as $R_n=R_1/(1+a^{x_1})(1+ra^{x_1})(1+r^3a^{x_1})(1+r^7a^{x_1}) \ldots$ and so on, and assuming that $r=a^{x_1}$, this equation simplifies to $R_1/R_n=(1+r)(1+r^2)(1+r^4)(1+r^8) \ldots$ and so on. Solving for r, at block 24, enables the specific gear ratios for an off road application to be determined using the aforementioned equations for $R_1$, $R_2$, $R_3$ and so on, at block 26.

Manual Transmission

For a manual transmission application, it is behooving to determine the number of teeth for each gear. Thus, after determining the gear ratios for each of the gears in accordance with the preferred method, the number of teeth is calculated for each gear using techniques well known in the art. Then, the appropriate gears are selected for the design and assembly of the manual transmission.

Figure 2:
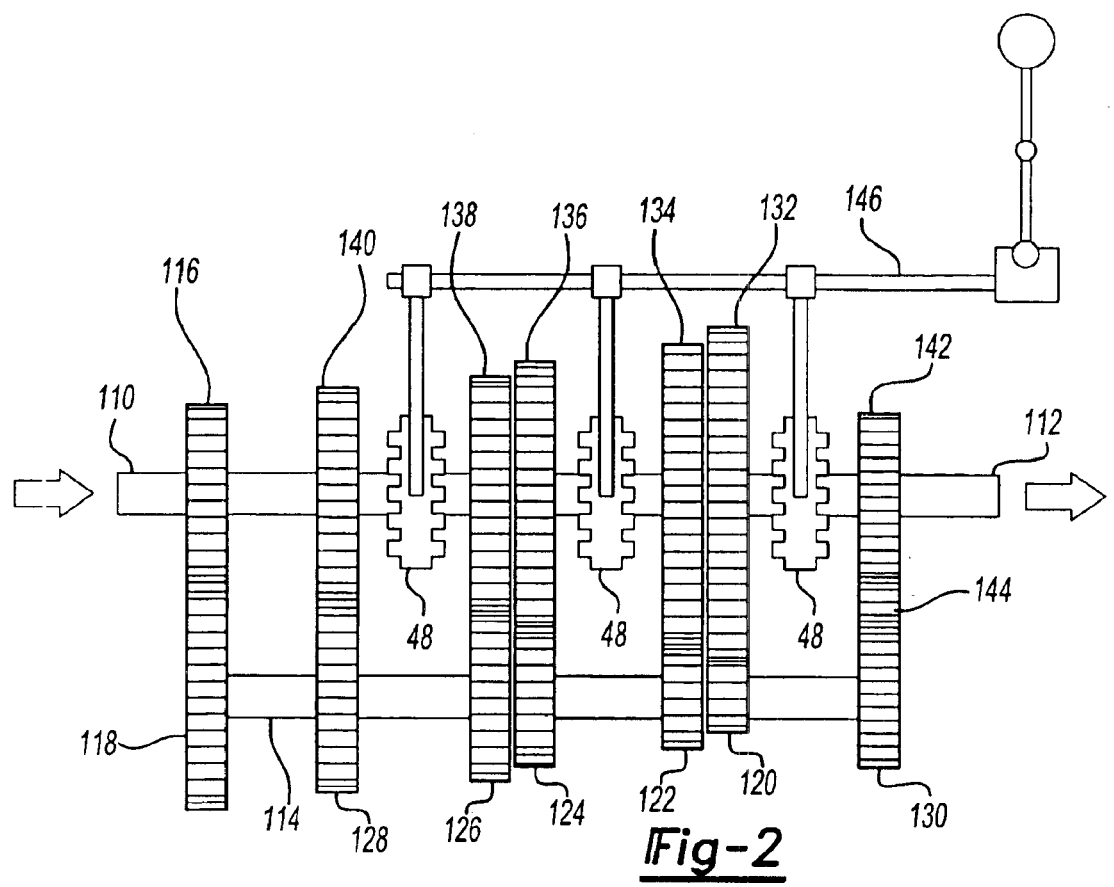
FIG. 2 is a schematic of an exemplary five-speed manual transmission with reverse and having forward drive gear ratios in accordance with the present invention.

With reference to FIG. 2, an exemplary manual transmission is shown having gear ratios selected in accordance with the preferred embodiment of the present invention. The manual transmission shown in FIG. 2 comprises an input shaft 110, an output shaft 112, and a lay shaft 114. The input shaft 110 includes a master input gear 116 in constant mesh engagement with a driven lay gear 118 fixed to the lay shaft 114. The lay shaft 114 further includes a set of lay gears rotatably attached to the lay shaft 114 including a first lay gear 120, a second lay gear 122, a third lay gear 124, a fourth lay gear 126, a fifth lay gear 128, and a reverse lay gear 130. The output shaft 112 includes a set of output gears rotatably attached to the output shaft 112 including a first output gear 132, a second output gear 134, a third output gear 136, a fourth output gear 138, a fifth output gear 140, and a reverse output gear 142 meshingly engaged with the reverse lay gear 130 via an idler gear 144. Output gears 132–140 are in constant mesh engagement with respective lay gears 120–128 in accordance with gear ratios selected in accordance with the preferred embodiment of the present invention.

The manual transmission of FIG. 2 further includes a gear selector rod and shift fork assembly 146 adapted to actuate a plurality of collars 148 rotatably attached to the output shaft 112 and adapted for manual selection between the output gears. It should be appreciated that alternatively, the plurality of collars 148 could be rotatably attached to the lay shaft 114 and in mechanical communication with the gear selector rod and shift fork assembly 146 to selectively engage a lay gear. Furthermore, the gear selector rod and shift fork assembly 146 could mechanically communicate with one or more gear synchronizers for selectively engaging a specific gear.

When a user manually engages a gear, whether it be an output gear or a lay gear, the user effectively selects a gear ratio. Regarding the transmission of FIG. 2, a user may manually select one of five forward drive gear ratios. A user may manually manipulate the gear selector rod and shift fork assembly 146 to engage the first output gear 132 with the first lay gear 120, thus selecting a low gear ratio. Likewise, it should be appreciated that a user may manipulate the gear selector rod and shift fork assembly 146 to engage any of the corresponding output gears and lay gears, thus selecting a different input to output gear ratio specific to each gear.

Automatic Transmission

Figure 3:
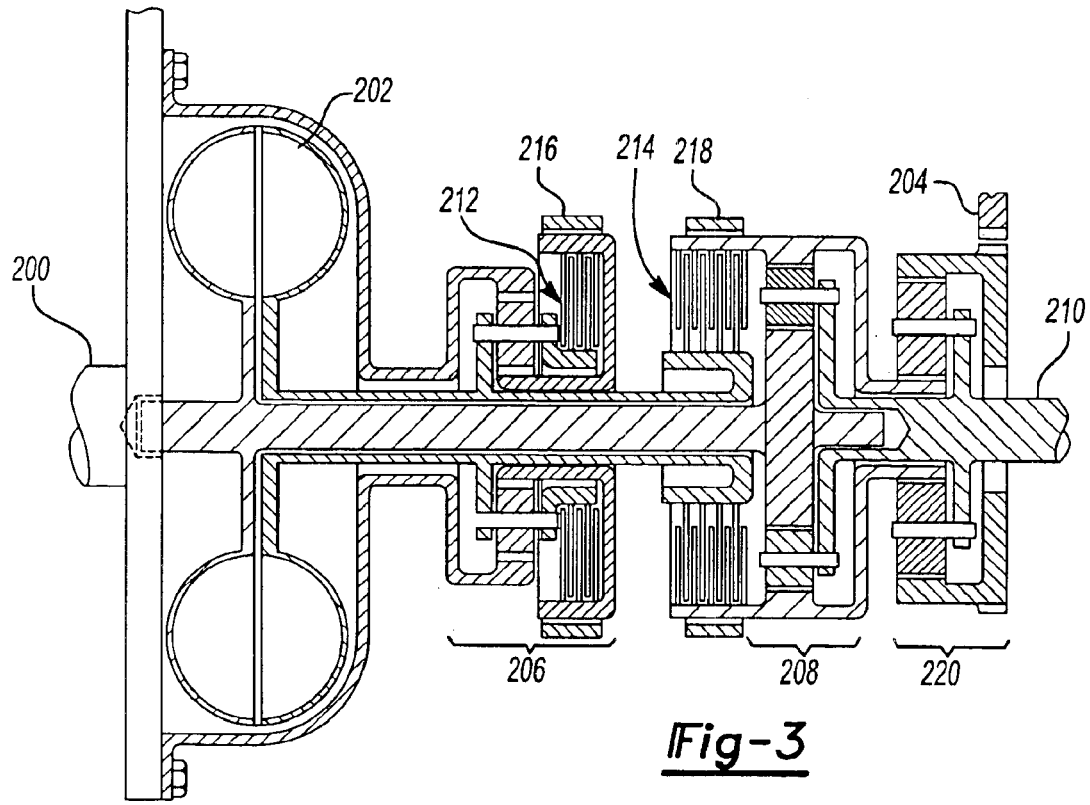
FIG. 3 is a schematic view of an exemplary four-speed automatic transmission with reverse and having forward drive gear ratios selected in accordance with the present invention.

Referring now to FIG. 3, an exemplary automatic transmission is shown, which is capable of producing a plurality of input to output gear ratios having gears ratios selected in accordance with the preferred embodiment of the present invention. FIG. 3 shows a simple embodiment of an automatic transmission having an input shaft 200, an output shaft 210, a torque converter 202, and a planetary gear system having a first planetary gear set 206, a second planetary gear set 208, and a third planetary gear set 220. Each planetary gear set includes a sun gear, a ring gear and planet gears as is known in the art. Further, the automatic transmission of FIG. 3 includes an actuating system including a first clutch mechanism 212, a second clutch mechanism 214, a first brake mechanism 216, a second brake mechanism 218, and a reverse brake mechanism 204 for selectively engaging components of the planetary gear system to produce different input shaft 200 to output shaft 210 rotational ratios, or gear ratios.

It should be appreciated that the automatic transmission of FIG. 3 has four forward drive gears and one reverse gear. In low gear, the first brake mechanism 216 and the second brake mechanism 218 are actuated to prevent rotation of the sun gear of the first planetary gear set 206 and the ring gear of the second planetary gear set 208. In second gear, the first clutch mechanism 212 is actuated to rotate the sun gear of the first planetary gear set 206 with its planet gears, and the second brake mechanism 218 is actuated to prevent rotation of the ring gear of the second planetary gear set 280. In third gear, the first brake mechanism 216 is actuated to prevent rotation of the sun gear of the first planetary gear set 206, and the second clutch mechanism 214 is actuated to rotate the ring gear of the second planetary gear set 208. Finally, in fourth gear, the first clutch mechanism 212 is actuated to rotate the sun gear of the first planetary gear set 206 with its planet gears, and the second clutch mechanism 214 is actuate to rotate the ring gear of the second planetary gear set 208. The third planetary gear set 220 and the reverse brake mechanism 204 are only utilized in the event of reversing the rotation of the output shaft 210 relative to the rotation of the input shaft 200, thus establishing a reverse mode.

The variety of gear ratios for the automatic transmission of FIG. 3 depend upon the gears in the planetary gear system, more specifically the sun gear, the ring gear, and the planet gears in the first planetary gear set 206 and the second planetary gear set 208. Thus, these gears are selected in accordance with the preferred embodiment of the present invention.

This description of the invention is merely exemplary in nature and, thus, variations that do not depart from the heart of the invention are intended to be within its scope. Such variations are not to be regarded as a departure from the spirit and scope of the invention.

What is claimed is:

1. A method of selecting gear ratios for use in a motor vehicle transmission having a plurality of gears, which comprises:

determining a low gear ratio, and a high gear ratio;

determining a total ratio spread by dividing said low gear ratio by said high gear ratio;

determining a number of gear ratios;

determining a number of ratio steps by subtracting one from said number of gear ratios;

determining a ratio variable by raising said total ratio spread to a power inverse of said number of ratio steps;

determining values for said ratio steps by creating a geometric sequence having a plurality of terms representing each of said respective steps such that a ratio of any two consecutive of ratio steps is a common percent constant; and determining a gear ratio for each of the gears in the transmission by dividing the immediately previous gear ratio by its respective ratio step plus one so as to have uniformly progressive ratio steps, wherein narrow step ratios provide for a smaller skip shift index and wide step ratios provide for a larger skip shift index.

2. The method of selecting gear ratios as recited in claim 1, wherein said step of creating a geometric sequence further comprises determining values for each of said plurality of terms by raising said ratio variable minus one to different powers, such that a step ratio constant exists between each adjacent term of said plurality of terms.

3. The method of selecting gear ratios as recited in claim 1, wherein said step of creating a geometric sequence further comprises determining values for each of said plurality of terms by raising said ratio variable minus one to different powers, such that said plurality of terms create a geometric sequence.

4. A transmission for use in a motor vehicle, comprising:
   a housing;
   an input shaft;
   an output shaft;
   a plurality of gearsets wherein each gearset includes a plurality of gears adapted to meshingly engage one another in accordance with a plurality of gear ratios selected by determining a low gear ratio, and a high gear ratio, determining a total ratio spread by dividing said low gear ratio by said high gear ratio, determining a number of selectable gears, determining a number of ratio steps by subtracting one from said number of selectable gears, determining a ratio variable by raising said total ratio spread to a power inverse of said number of ratio steps, determining values for said ratio steps by creating a geometric sequence having a plurality of terms consistent with said number of ratio steps such that a ratio of any two consecutive ratio steps is a common percent constant, wherein each of said terms represent each of said respective ratio steps, and determining a gear ratio for each of said gears in said transmission by dividing the immediately previous gear ratio by its respective ratio step plus one so as to have uniformly progressive ratio steps, wherein narrow step ratios provide for a smaller skip shift index and wide step ratios provide for a larger skip shift index; and
   a means for selectively engaging one of said plurality of gear ratios.

5. The transmission of claim 4, wherein said step of creating a geometric sequence further comprises determining values for each of said plurality of terms by raising said ratio variable minus one to different powers, such that a step ratio constant exists between each adjacent term of said plurality of terms.

6. The transmission of claim 4, wherein said step of creating a geometric sequence further comprises determining values for each of said plurality of terms by raising said ratio variable minus one to different powers, such that said plurality of terms create a geometric sequence.

7. A manual transmission for use in a motor vehicle, comprising:
   a housing;
   an input shaft;
   an output shaft;
   a lay shaft meshingly engaged with said input shaft;
   a first plurality of gears attached to said lay shaft;
   a second plurality of gears attached to said output shaft adapted to meshingly engage said first plurality of gears wherein a set of gear ratios for said first and second plurality of gears are determined by determining a low gear ratio, and a high gear ratio, determining a total ratio spread by dividing said low gear ratio by said high gear ratio, determining a number of selectable gears, determining a number of ratio steps by subtracting one from said number of selectable gears, determining a ratio variable by raising said total ratio spread to a power inverse of said number of ratio steps, determining values for said ratio steps by creating a geometric sequence having a plurality of terms consistent with said number of ratio steps such that a ratio of any two consecutive ratio steps is a common percent constant, wherein each of said terms represent each of said respective ratio steps, and determining a gear ratio for each of the gears in the transmission by dividing the immediately previous gear ratio by its respective ratio step plus one so as to have uniformly progressive ratio steps, wherein narrow step ratios provide for a smaller skip shift index and wide step ratios provide for a larger skip shift index; and
   a clutch mechanism operable to selectively engage a specific gear ratio of said first and second plurality of gears.

8. The manual transmission of claim 7, wherein said step of creating a geometric sequence further comprises determining values for each of said plurality of terms by raising said ratio variable minus one to different powers, such that a step ratio constant exists between each adjacent term of said plurality of terms.

9. The manual transmission of claim 7, wherein said step of creating a geometric sequence further comprises determining values for each of said plurality of terms by raising said ratio variable minus one to different powers, such that said plurality of terms create a geometric sequence.

10. A process for assembling a manual transmission for use in a motor vehicle, comprising:
    determining a number of gear ratios included in the transmission;
    selecting said gear ratios by determining a low gear ratio and a high gear ratio, determining a total ratio spread by dividing said low gear ratio by said high gear ratio, determining the number of ratio steps by subtracting one from said number of gear ratios, determining a ratio variable by raising said total ratio spread to a power inverse of said number of ratio steps, determining values for said ratio steps by creating a geometric sequence having a plurality of terms consistent with said number of ratio steps such that a ratio of any two consecutive ratio steps is a common percent constant, wherein each of said terms respectively represent each of said ratio steps, and determining gear ratios for each of said gears in the transmission by dividing the immediately previous gear ratio by its respective ratio step plus one so as to have uniformly progressive ratio steps, wherein narrow step ratios provide for a smaller skip shift index and wide step ratios provide for a larger skip shift index;
    attaching a plurality of lay gears to a lay shaft in accordance with said selected gear ratios;
    attaching a plurality of output gears to an output shaft in accordance with said selected gear ratios;
    securing said output shaft with said output gears and said lay shaft with said lay gears within a transmission housing such that said output gears and said lay gears meshingly engage; and
    attaching a clutch system to said transmission housing operable to selectively drivingly engage one of said plurality of lay gears and one of said plurality of output gears.

11. The process of assembling a manual transmission as recited in claim 10, wherein said step of creating a geometric sequence further comprises determining values for each of said plurality of terms by raising said ratio variable minus one to different powers, such that a step ratio constant exists between each adjacent term of said plurality of terms.

12. The process of assembling a manual transmission as recited in claim 10, wherein said step of creating a geometric sequence further comprises determining values for each of said plurality of terms by raising said ratio variable minus one to different powers, such that said plurality of terms create a geometric sequence.

13. An automatic transmission having a plurality of gear ratios for use in a motor vehicle, comprising:

a transmission housing;

an input shaft;

a coupling operably engaged with said input shaft;

a planetary gear system capable of providing a plurality of gear ratios, wherein said planetary gear system is selected by determining a low gear ratio, and a high gear ratio, determining a total ratio spread by dividing said low gear ratio by said high gear ratio, determining a number of gear ratios, determining a number of ratio steps by subtracting one from said number of gear ratios, determining a ratio variable by raising said total ratio spread to a power inverse of said number of ratio steps, determining values for said ratio steps by creating a geometric sequence having a plurality of terms consistent with said number of ratio steps such that a ratio of any two consecutive ratio steps is a common percent constant, wherein each of said terms respectively represent each of said ratio steps, and determining gear ratios for each of the gears in the transmission by dividing the immediately previous gear ratio by its respective ratio step plus one so as to provide uniformly progressive ratio steps, wherein narrow step ratios provide for a smaller skip shift index and wide step ratios provide for a larger skip shift index;

an actuating system operable to selectively engage said plurality of gear ratios; and an output shaft operably engaged with said planetary gear system.

14. The automatic transmission of claim 13, wherein said step of creating a geometric sequence further comprises determining values for each of said plurality of terms by raising said ratio variable minus one to different powers, such that a step ratio constant exists between each adjacent term of said plurality of terms.

15. The automatic transmission of claim 13, wherein said step of creating a geometric sequence further comprises determining values for each of said plurality of terms by raising said ratio variable minus one to different powers, such that said plurality of terms create a geometric sequence.

16. The automatic transmission of claim 13, wherein said planetary gear system includes a first and second planetary gear set selected in accordance with said gear ratios.

17. The automatic transmission of claim 16, wherein said actuating system includes a plurality of clutch mechanisms and a plurality of braking mechanisms.

* * * * *